United States Patent [19]
Wells

[11] Patent Number: 5,244,531
[45] Date of Patent: Sep. 14, 1993

[54] ROOFING SEAM ROLLER
[75] Inventor: Phillip W. Wells, Lincoln, Nebr.
[73] Assignee: W-W Sales, Incorporated, Lincoln, Nebr.
[21] Appl. No.: 657,400
[22] Filed: Feb. 19, 1991
[51] Int. Cl.[5] .............................................. B31F 1/00
[52] U.S. Cl. ................................... 156/555; 156/579; 29/240; 29/244; 29/271; 29/874.3; 16/45; 16/47
[58] Field of Search ................... 156/555, 579; 16/45, 16/47; 29/240, 244, 271,894.3

[56] References Cited
U.S. PATENT DOCUMENTS

| 846,451 | 3/1907 | Burry | 16/47 |
|---|---|---|---|
| 2,693,893 | 11/1954 | Rice et al. | 29/116.1 |
| 2,964,778 | 12/1960 | Frey | 16/45 |
| 3,899,801 | 8/1975 | Carrier | 16/45 |
| 3,981,042 | 9/1976 | Carrier | 16/45 |
| 4,053,129 | 10/1977 | Graff | 16/47 |
| 4,215,769 | 8/1980 | Kuc | 16/47 |
| 4,224,726 | 9/1980 | Walker | 29/121.1 |
| 4,239,581 | 12/1980 | Lang | 156/579 |
| 4,460,433 | 7/1984 | Boyd | 156/579 |
| 4,504,352 | 3/1985 | Meyer | 156/579 |
| 4,602,978 | 7/1986 | Eckstein | 156/579 |
| 4,605,253 | 8/1986 | Anderson | 29/270 |
| 4,861,400 | 8/1989 | Sargent | 156/579 |

Primary Examiner—David A. Simmons
Assistant Examiner—Merrick Dixon
Attorney, Agent, or Firm—Vincent L. Carney

[57] ABSTRACT

To fasten a seam of sheet material, a seam roller is positioned over a seam of roofing material having overlapping portions of sheets of roofing material which are forced together as rollers pass over. Each of a plurality of rollers is mounted to rotate around a horizontal roller axis in circumferentially spaced apart relationship with each other at an angle to the radii of their circles of rotation, which circle is in a plane at an angle to the horizontal. With this arrangement, the rollers apply a forward pulling action on the seam roller, and apply a pressure to the sheet material in a sweeping motion that removes air.

11 Claims, 4 Drawing Sheets

ROOFING SEAM ROLLER

BACKGROUND OF THE INVENTION

This invention relates to rollers for sealing seams in sheet material such as for example roofing sheet material or water pond type sheet material.

It is known to seal together sheet material such as on roofs by applying adhesive material to the edges of the sheets where they are to be joined, overlapping them and permitting the adhesive material to set. The overlapping sections are pressed by a roller to cause the separate sheets to form a better seal with each other.

In one prior art method of this type, hand rollers are used to roll across the seams in a direction that imparts enough pressure by hand to make a seal. If this work is done carelessly, the seal is not permanent and may be wrinkled.

In another prior art method, a hand drill has rollers mounted on it. The rollers orbit in a circle about the drill spindle and apply pressure to the overlapping portion of sheet material to cause them to seal together. This type of device is disclosed in U.S. Pat. No. 4,861,400 to Sergant.

The above noted apparatus has several disadvantages, such as for example: (1) they are slow and inefficient; (2) they provide irregular results; (3) an operator from time to time will skip a section thus leaving an unsealed portion of the mat; (4) some undesirable slipping occurs between the pressure roller and the outer surface of the sheet material; and (5) the rollers of a drill mounted seam roller may kick-up or lift the sheet material.

SUMMARY OF THE INVENTION

Accordingly, it is an object of the invention to provide novel seam roller.

It is a further object of the invention to provide a novel method for sealing seams of sheet material such as for example sheet material that seals roofs or the bottoms of ponds.

It is a further object of the invention to provide a novel apparatus which has synchronized forward movement and pressure movement against sheet material to force sealant to fuse together.

It is a further object of the invention to provide a novel self-propelled seam roller for sealing roofing material.

Accordingly, roofs are sealed by strips of material such as rubber sheets which are laid together in overlapping fashion. Cement is applied to the portions of the sheets that are to be overlapped near their edges so that dried cemented sheets overlie each other to form a continuous sealed surface. A roofer then moves a seam roller across the overlapping portions, which seam roller applies force in the range of 10 to 35 pounds through rollers that are synchronized with the forward motion of the seam roller so that rollers roll across the surface in a single direction to sweep air out of one side and apply sufficient pressure to seal the overlapping portions.

In a preferred embodiment, the seam roller is self-propelled and controlled by a roofer that walks behind it holding handles. The rollers are motor driven to orbit about a center of orbiting and roll across the sheet material, pressing in single overlapping directions on the sheet material. A rotor that orbits the rollers is positioned to: (1) maintain a substantially even distance of the rollers from the surface that is being rolled; and (2) control the end of contact between the rotors and the sheet material.

In one embodiment, the rollers are mounted to a rotating disk tilted at an angle and driven by an electric motor, all of which is mounted on two wheels. The rollers on the disk are mounted sufficiently close to each other so that one roller is always in contact with the surface to prevent the upward and downward bouncing motion of the seam roller. The strokes are timed to minimize vibration and provide overlapping rolling as the seam roller rolls along synchronized with the rollers so that every location has pressure of sufficient force to form a seal applied to it at least once and preferably at least 3 times.

The rollers 19A-19H are mounted in a circle to orbit about an orbital axis in an orbital plane. Each roller is mounted with its axle at an angle of between 1 and 45 degrees to the radius of the circle and preferably 5 degrees. The orbital plane is at an angle to the horizontal of between 1 and 60 degrees and preferably ten degrees with the lowest point being located between the wheels to contact the sheel material. The location of the point of contact of the rollers with respect to the wheels that support the weight of the seam roller is adjusted to apply a portion of the weight of the seam roller to the point of contact sufficently low to avoid stalling the motor, tearing the sheet material or damaging the apparatus but adequate to seal the sheet material. This weight is between 10 and 35 pounds and preferably 23 pounds.

From the above description, it can be understood that the seam roller of this invention has several advantages such as: (1) the roller action and forward movement are automatically synchronized so that the entire edge is sealed; (2) a uniform adequate pressure is applied to the surface without substantial friction that could cause wrinkling; and (3) it is fast and efficient.

SUMMARY OF THE DRAWINGS

The above noted and other features of the invention will be better understood from the following detailed description when considered with reference to the accompanying drawings in which.

DETAILED DESCRIPTION

Figure 1:
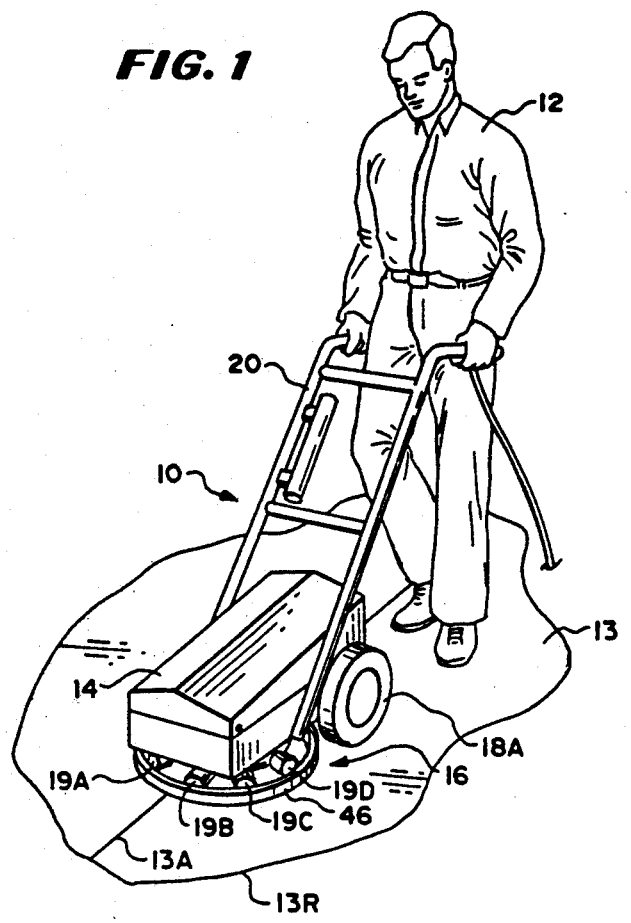
FIG. 1 is a perspective view of a seam roller in accordance with the invention.

In FIG. 1, there is shown a perspective view of the seam roller 10 being operated by a roofer 12. The seam roller 10 includes a motor housing 14, a pressure applicator 16, a pair of wheels, one of which is shown at 18A and handles and controls shown generally at 20. The handles and controls 20 extend upwardly where they may be grasped by the operator 12 to control motion of the seam roller 10. The motor switch is mounted as shown and described hereinafter with respect to FIG. 9. They are attached at their bottom end to the sides of the housing 14 which contains within it a motor that rotates a circular support having an inner plate (not shown in FIG. 1) and an outer circular member 17 (FIG. 4) with a plurality of pressure rollers 19A-19H (19A-19D being shown in FIG. 1) so that the rollers orbit about a center of rotation. While the rollers 19A-19H are orbiting, they roll at one point against the sheet material and exert a downward pressure. The axis of the rollers 19A-19H are angled to pull the vehicle forward at a rate synchronized to the rate of rotation.

The axle of the wheels, such as 18A, are positioned so that the center of gravity exerts a force downwardly on the rollers 19A-19H that are against the sheet material of between 10 and 35 pounds and approximately 20 pounds. This can be adjusted by adjusting the weight of the seam roller 10 or the location of the axis to shift the center of gravity forward. The area of contact of each roller 19A-19H is between one-eighth square inch to 12 square inches and preferably three-eighths square inch and generally along its entire length. More than one roller contacts the surface at a time to reduce vibration.

Figure 2:
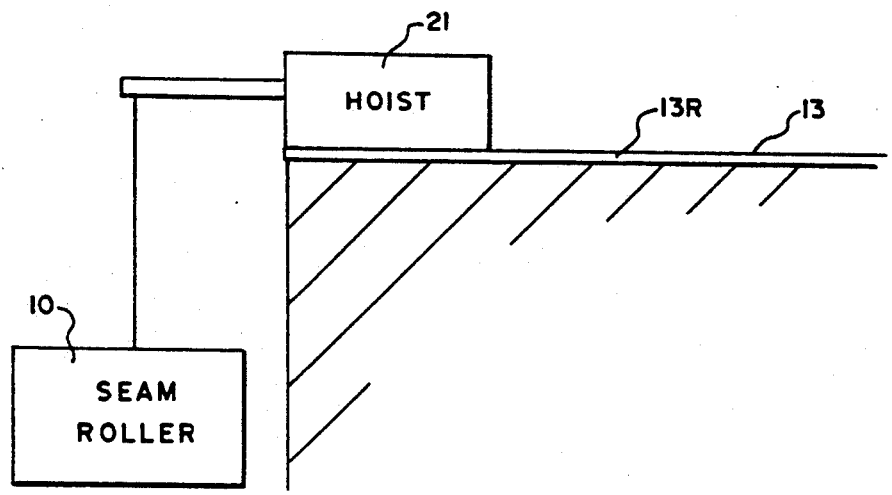
FIG. 2 is a schematic block diagram of a seam roller being lifted onto a roof for use in accordance with the invention.

As shown in FIG. 2, a hoist 21 is used to lift roofing material 13 and the seam roller 10 onto a roof 13R. The roofing material 13 is then positioned in overlapping parallel strips (or sheets) on the roof 13R so as to have an overlapping at seam 13A (FIG. 1).

Figure 3:
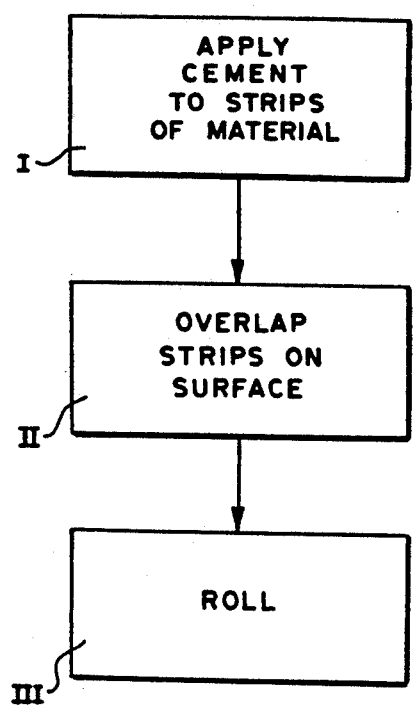
FIG. 3 is a schematic block diagram of the steps in a method of using a seam roller in accordance with the invention.

As shown in steps I and II of FIG. 3, cement is applied to the overlapping positions of roofing material 13. The cement used is preferably a substantially water insoluable adhesive. These steps may be performed in any convenient order such as to lay the sheets and then apply cement along one surface or to apply cement to one end of the top surface of a sheet already laid and then lay the other sheet on it. After an overlapping cemented seam is formed, the seam roller 10 is positioned on a seam such as 13A (FIG. 1) and operated.

In use, the roofing seam roller 10 propels itself over the seam 13A of the roofing material 13 and the operator 12 controls the direction of travel of roofing seam roller 10. The amount of pulling is synchronized so that at least three strokes of a roller are required at any location to move the roller beyond that location. The overlapping portions of roofing material are forced together as the rollers pass over them. In passing over the seam, a motor driven roller plate is rotated around a substantially vertical axis tilted enough so that as it turns, rollers mounted around its perifery are orbited and contact the seam only on the forward end of the seam roller 10 and of the orbital path for counter-clockwise rotation when the upper layer of sheet material is on the right or at the trailing edge for clockwise rotation when the upper layer is on the right hand side of the direction of movement of the seam roller. Each of the rollers 19A-19H are mounted on a substantially corresponding horizontal roller axis 42A-42H (FIG. 6), and travel along a cycloid path and control the seam 13A of roofing material to sweep a segment of the cycloid from the higher sheet to the lower at the side of contact. This action forces the sheets of roofing material together as the rollers roll thereon. In this specification "substantially horizontal" means closer to horizontal than to vertical and "substantially vertical" means closer to the vertical than to the horizontal.

Figure 4:
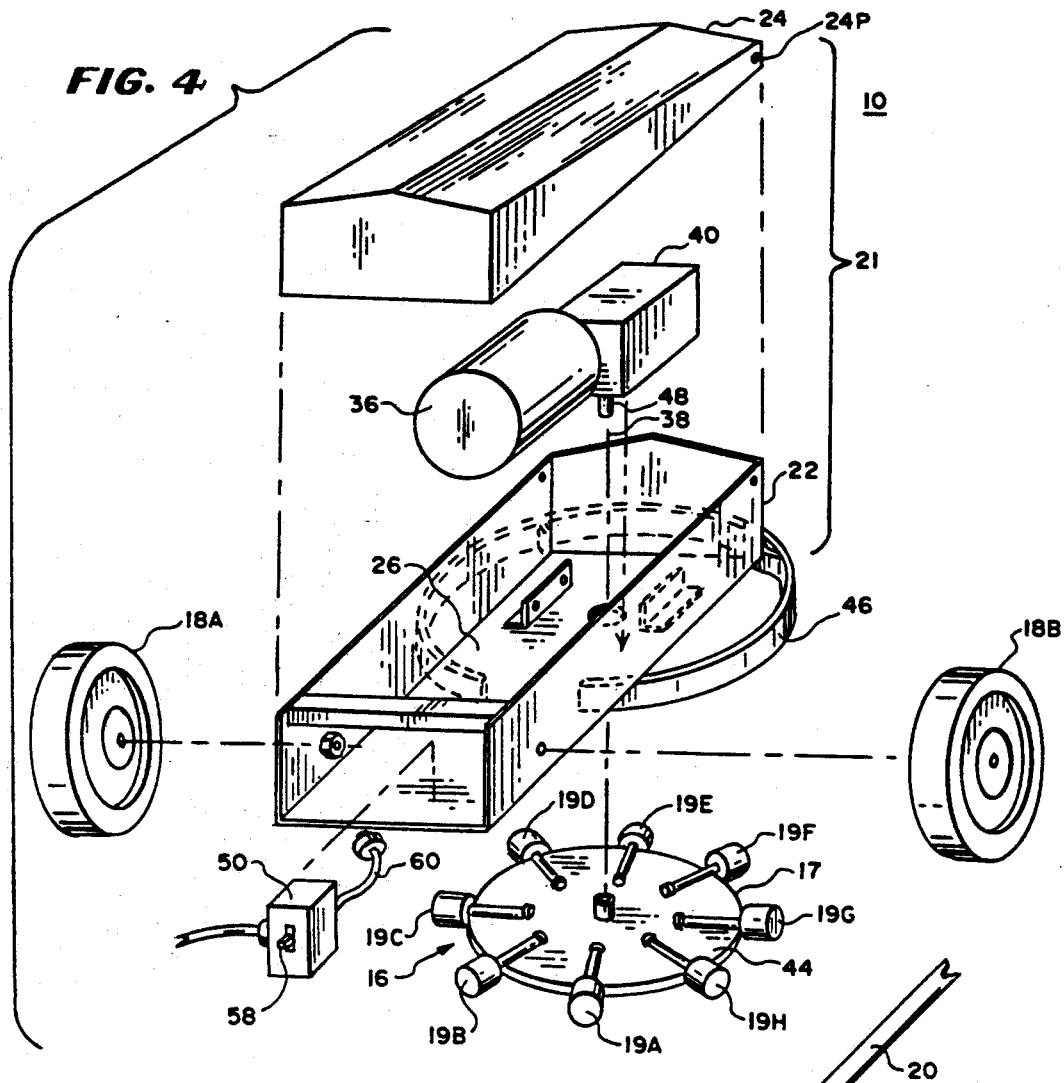
FIG. 4 is an exploded fragmentary perspective view of a seam roller in accordance with the invention.

In FIG. 4, there is shown an exploded fragmentary perspective view of a seam roller 10 adapted to roll on planar roofing material having pressure applicator 16, wheels 18B and 18A, carriage assembly 21, a handle (not shown in FIG. 4) a motor 36 and a coupling transmission 40. The coupling transmission 40 and motor 36 may be any suitable type and are not part of the invention except insofar as they cooperate to drive the pressure applicator 16. The pressure applicator 16 includes a roller plate 44, 8 rollers 19A-19H and support ring 17.

The motor 36 and coupling transmission 40 are supported by the base 22 of housing 14 with the motor 36 having its drive shaft 38 positioned along a horizontal axis. The drive shaft 38 is adapted to provide rotational force to gear box coupling 40 which changes their direction to apply them to the coupling shaft 48. The pressure applicator 16 is supported by circular roller plate 44, which is connected to coupling 40 by coupling shaft 48 and roller plate guard 46 is connected to base 22.

As best shown in FIG. 4, the housing 14 has a base 22 and a hood 24 with hood 24 being pivotally connected to the base 22 by pin 24P. However, any other type of fastener, such as a bolt, may be used in place of the pin 24P and the housing 14 may take other forms. The coupling 40 is driven by motor 36 and adapted to turn coupling shaft 48 around a substantially vertical axis. The pressure applicator 16 and wheels 18A and 18B are supported on roofing material 13 (FIG. 1) and arranged so that the pressure applicator 16 is connected to roller axle 42 and turns within a substantially horizontal plane but at a sufficient angled roof or other surface to contact roofing sheets across only one section of its rotation.

Figure 5:
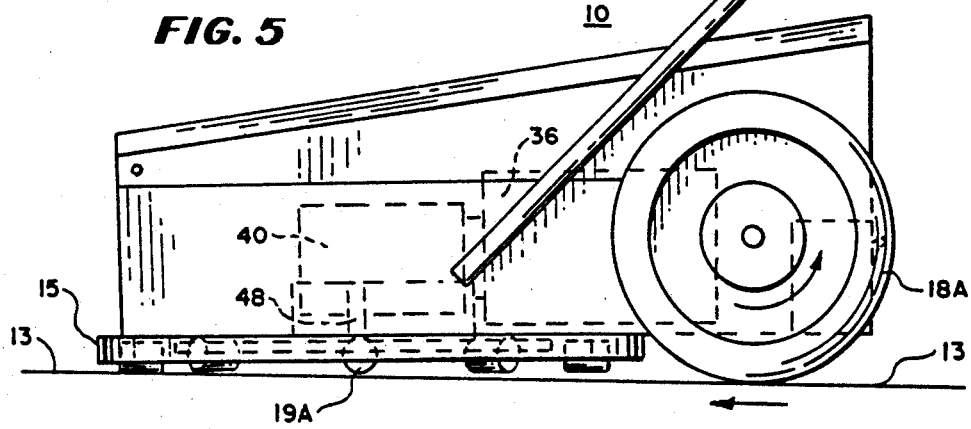
FIG. 5 is a fragmentary side view of a seam roller in accordance with the invention.
Figure 6:
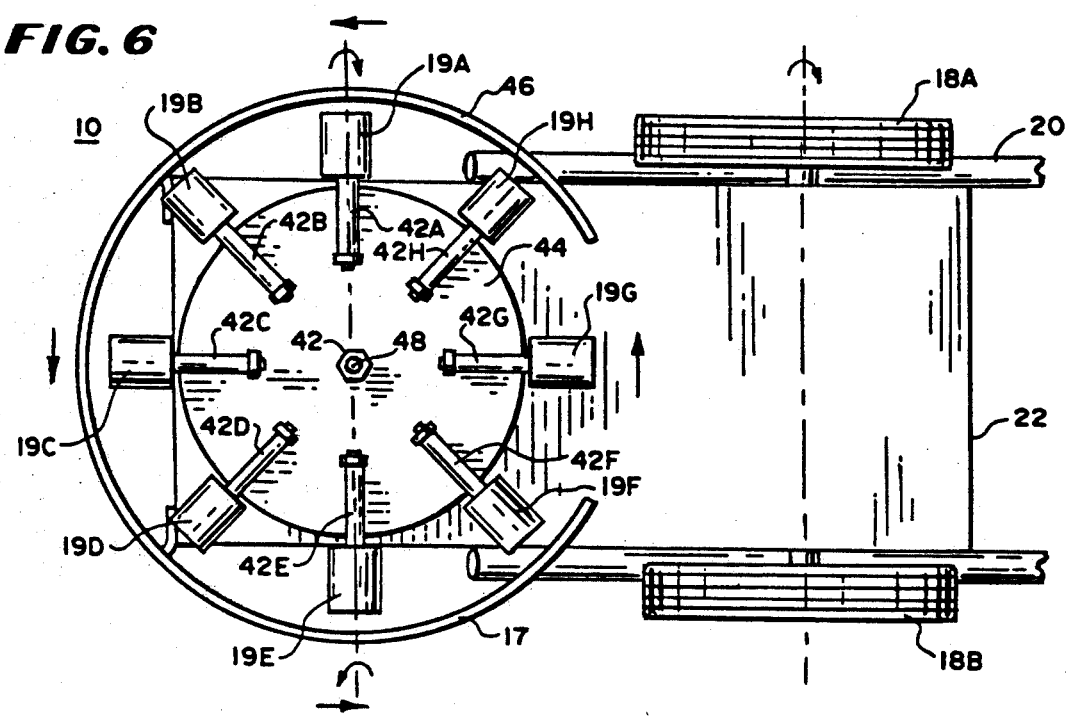
FIG. 6 is a bottom view of a seam roller in accordance with the invention.

As best shown in FIGS. 5 and 6, as the roofing seam roller 10 moves linearly forward, the rollers 19A-19H orbit in an orbit plane 15 and the wheel axis for wheels 18A and 18B travel in a wheel plane with the orbit plane 15 and wheel plane being at an angle to each other but the plane of contact of the rollers 19A-19H in contact with the sheet material being parallel to that of the wheel axle plane and below it. The base 22 of the seam roller 10 is supported by the wheels 18A and 18B and certain of the rollers 19A-19H with the location of the rollers and wheels being selected to cause the appropriate part of the weight of the seam roller 10 to fall on the sheet material. The roller plate guard 46 is connected to base 22 and a handle 20 is connected to base 22 for controlling the direction of movement of the seam roller 10.

The motor 36 is connected to a switch box 50 (FIG. 4) and the switch box 50 is connected to a power cord 60 (FIG. 4) which is adapted to be connected to a source of electric power. The switch box 50 encloses switch 58 (FIG. 4). The switch 58 is connected to power cord 60 which is adapted to be connected to a source of electric power. The motor 36 is connected to the switch 58. A strain relief mounting bracket is provided to support the power cord 60 in a manner known in the art and connected to floor 26 (FIG. 4) of base 22.

A handle mounting bracket is connected to the base 22 and adapted to support handle 20 having a weld tab and a restraining bolt. The restraining bolt prevents the handle 20 from sliding out of the handle mounting bracket while seam roller 10 is in use.

When the switch 58 is turned to its on position, electric current is conducted from the source of electric power through the power cord 60 to the motor 36. The coupling 40 turns the roller plate 44 around a substantially vertical axis as the rollers 19A-19H rotate around their respective horizontal roller axis 42A-42H and travels along a curved (cycloid) path of roofing material 13 as the rollers orbit about the substantially vertical axis. As wheels 18A and 18B turn around horizontal wheel axis they follow a straight line of travel.

As best shown in FIG. 6, the rollers 19A-19H are mounted in a circle to orbit about an orbital axis in an orbital plane. Each roller 19A-19H is mounted with its corresponding axle 42A-42H at an angle of between 1 and 45 degrees to the radius of the circle, and preferably 5 degrees. The orbital plane is an angle to the horizontal of between 1 and 60 degrees and preferably ten degrees with the lowest point being located between the wheels 18A and 18B to contact the sheet material. The location of the point of contact of the rollers with respect to the wheels that support the weight of the seam roller 10 is adjusted to apply a portion of the weight of the seam roller 10 to the point of contact sufficently low to avoid stalling the motor 36, tearing the sheet material or damaging the apparatus but adequate to seal the sheet material. This weight is between 10 and 35 pounds and preferably 23 pounds.

Figure 7:
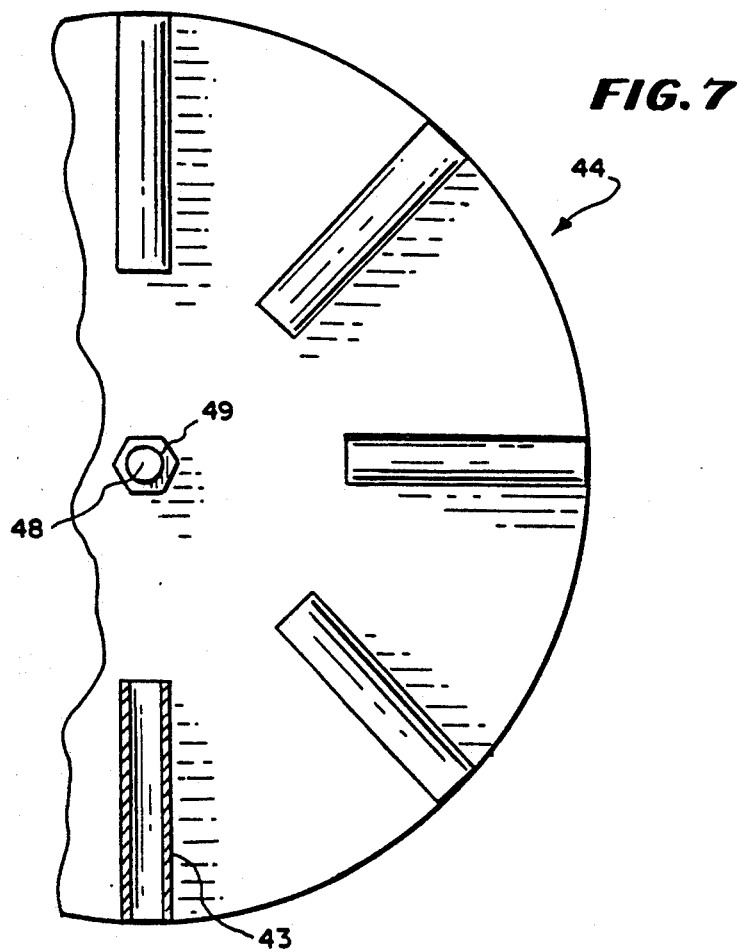
FIG. 7 is a fragmentary top view partly broken away and cross-sectioned of a roller plate for a seam roller in accordance with the invention.
Figure 8:
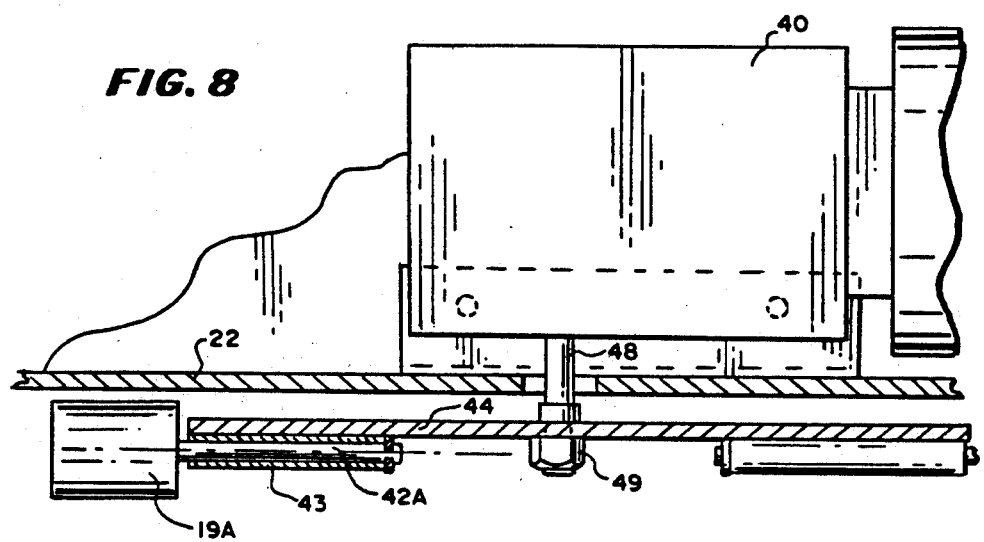
FIG. 8 is a partial cross-sectional side view of a roller mounted to a roller plate of a seam roller in accordance with the invention.

As best shown in FIGS. 7 and 8, the roller plate 44 has a roller axle channel wall 43 which supports roller axle 42A (FIG. 6). The hub 49 is welded to the roller plate 44 and secured to coupling shaft 48 by a keyway and set screws and the roller axle 42A supports a corresponding roller 19A. The coupling 40 is supported by the base 22 and connected to the circular roller plate 44 to rotate the same. The roller axle 42A is supported under circular roller plate 44, as best shown in FIG. 8.

Figure 9:
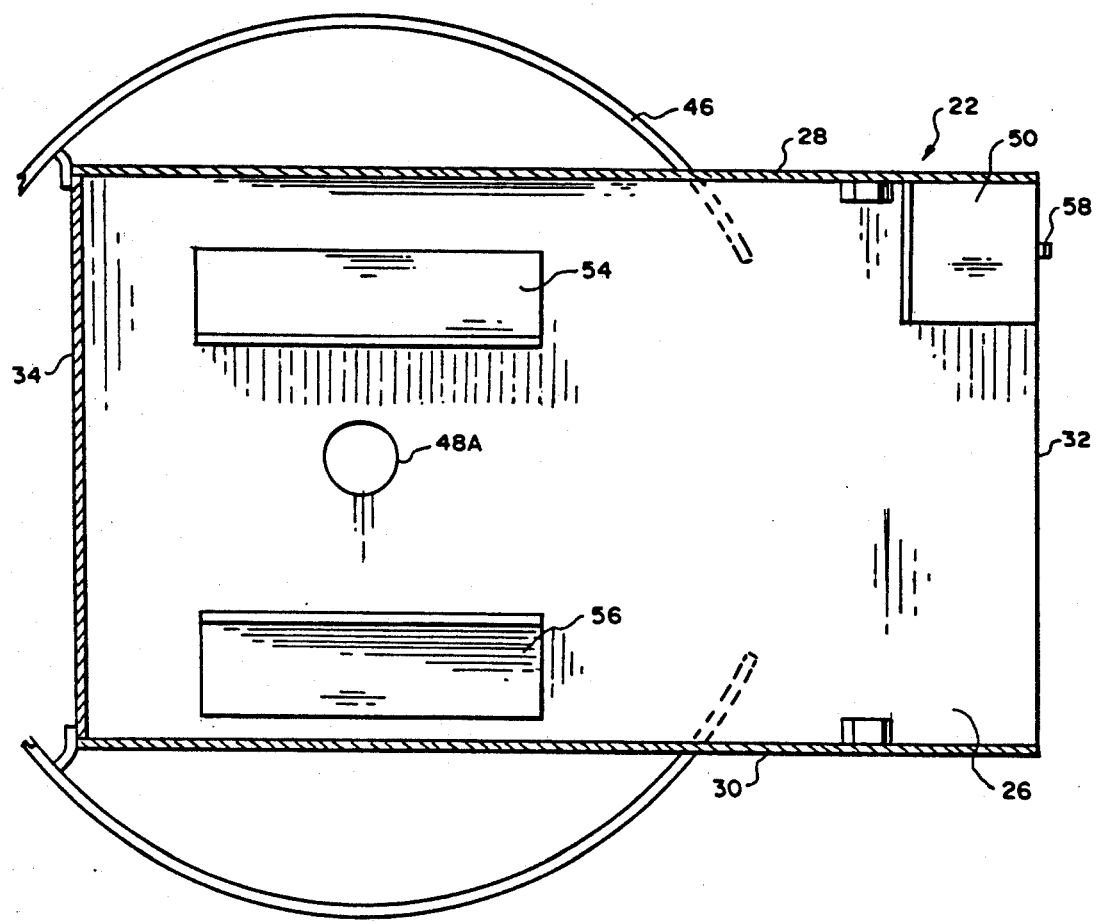
FIG. 9 is a top view of a base of a seam roller in accordance with the invention.

As best shown in FIG. 9, the base 22 has a floor 26, side walls 28 and 30 and an end wall 34. The side walls 28 and 30 and end wall 34 are connected to the floor 26. Coupling mounting brackets 54 and 56 are connected to the floor 26 of the base 22. Coupling shaft channel 48A extends through floor 26 of the base 22. Axle mounting nuts 19B and 19C are connected to the side walls 28 and 30 respectively and the roller plate guard 46 is connected to the base 22. The motor switch 58 is connected to the floor 26 of the base 22 by a switch box 50.

In using the invention, sheets of roofing material are laid together in overlapping fashion and adhesive cement is applied to the overlapping edges. A seam roller 10 is positioned over a seam of the roofing material and the seam of roofing material is continuously and uniformly sealed as overlapping portions of the sheets of roofing material are forced together.

From about ten to about thirty-five pounds of force are applied by rollers passing over the sheets in a single direction to sweep air out from between the sheets. The rollers 19A-19H are mounted to a roller plate 44 which is tilted at an angle to the vertical axis of between 2 and 60 degrees in a plane substantially aligned with the seam and with the upward end being tilted in: (1) the direction of movement of the seam roller 10 for clockwise rotation of the plate 44 where the upper sheet material is on the left in the preferred.embodiment; but (2) could be in the trailing direction for clockwise rotation when the upper sheet is on the right and counter-clockwise rotation when the upper sheet is on the left; or (3) the direction of movement of the seam roller on the right for clockwise rotation when the upper sheet material is on the right. The rollers 19A-19H are mounted sufficiently close together so that at least one roller is always in contact with the surface to prevent upward movement of the overlapping edges as the seam roller 10 seals the portion of the seam thereunder. The rotations of the roller plate 44 are timed to minimize vibration of the overlapping edges.

The rollers 19A-19H uniformly apply pressure to the seam so that the strips seal evenly. The weight of the seam roller 10 is sufficient to press the strips together without a need for the operator to apply force to the seam roller 10. The operator walks behind the seam roller 10. When a change in the direction of travel of the seam roller 10 is desired, the operator pushes the handles causing it to pivot on its wheels 18A and 18B.

Although a preferred embodiment of the invention is described with some particularity, many modifications and variations of the preferred embodiment may be made without deviating from the invention. Therefore, it is to be understood that within the scope of the appended claims, the invention may be practiced other than as specifically claimed.

What is claimed is:

1. A seam roller comprising;
   a plurality of pressure rollers;
   means for orbiting the pressure rollers about an axis of rotation in an orbital plane;
   said pressure rollers each having an axle;
   the axle of at least some of the rollers being positioned at an angle to the radius of orbiting, whereby the rollers are towed out so as to cause a forward pulling action of the seam roller;
   the orbital plane being at an angle, whereby the rollers contact a surface over a relatively short span in repeated single direction strokes so as to exert pressure against a seam.

2. A seam roller in accordance with claim 1 in which the angle between the orbital axis and the axle of each of the rollers is between 1 degree and 45 degrees.

3. A seam roller in accordance with claim 1 in which the pressure applied by the rollers is between 0.8 and 23 pounds per square inch and between 10 and 35 pounds force on the front of the machine.

4. A seam roller in accordance with claim 3 in which the plane of orbit is at an angle of between 1 and 45 degrees to the horizontal.

5. A seam roller in accordance with claim 1 in which each roller contacts the surface over about three-eighths of an inch at any one time and each portion of the surface is contacted at least three times.

6. A seam roller in accordance with claim 1 in which the speed of orbiting and distance between the rollers is selected to avoid vibration and bouncing.

7. A seam roller in accordance with claim 1 further including a frame;
   said rollers being mounted on said frame for oribiting therewith;
   said frame including at least two supporting means for supporting said frame and moving along a surface;
   said seam roller including a center of gravity;
   said point of contact of said orbital plane being between said two supporting means, whereby the pressure applied by the rollers is determined by the angle between the center of gravity and the point of contact and the distance between the bottoms of the supporting means, the center of gravity and the point of contact and the pulling is in line and directly between the two supporting means.

8. A seam roller comprising:
motor means;
coupling means;
roller means having a plurality of rollers;
said motor means having a drive shaft positioned along a horizontal axis and adapted to provide rotational force to said coupling means, said coupling means being adapted to turn said roller means around a substantially vertical axis as at least one of said rollers rotates around a substantially horizontal roller axis over a horizontal surface;
at least two wheels and a base, said base being supported by said wheels and at least one of said rollers, said coupling means and said motor means being supported by said base;
said seam roller including a center of gravity;
a point of contact of said roller means with said horizontal surface being along a line extending between said at least two wheels, whereby the pressure applied by the rollers is determined by the angle formed by a line from the center of gravity to the point of contact and the line extending between the at least two wheels and by the distances between the point of contact, the center of gravity and the at least two wheels, the center of gravity and the point of contact being positioned to provide a predetermined pressure on said point of contact.

9. The seam roller of claim 8 further comprising a roller plate guard, said roller plate guard being connected to said base.

10. The seam roller of claim 9 further comprising a handle, said handle and said at least two wheels being connected to said base.

11. The seam roller of claim 10 wherein said coupling means comprises a roller axle and a circular roller plate, said roller axle having a central roller axle axis and being supported by said circular roller plate, and said roller being connected to said roller axle wherein said circular roller plate is adapted to rotate around a central plate axis and said roller is adapted to rotate around said roller axis, said plate and roller axle axes being positioned in perpendicular planes.

* * * * *